(12) United States Patent
Pichel

(10) Patent No.: US 9,562,587 B2
(45) Date of Patent: Feb. 7, 2017

(54) DEVICE FOR ELASTICALLY MOUNTING AN ENGINE AND METHOD FOR PRODUCING SAID MOUNTING

(75) Inventor: Heiko Pichel, Steinau (DE)

(73) Assignee: Anvis Deutschland GmbH, Steinau an der Strasse (DE)

( * ) Notice: Subject to any disclaimer, the term of this patent is extended or adjusted under 35 U.S.C. 154(b) by 0 days.

(21) Appl. No.: 13/704,775

(22) PCT Filed: Jun. 21, 2011

(86) PCT No.: PCT/EP2011/003072
§ 371 (c)(1),
(2), (4) Date: Mar. 5, 2013

(87) PCT Pub. No.: WO2011/160825
PCT Pub. Date: Dec. 29, 2011

(65) Prior Publication Data
US 2013/0153741 A1     Jun. 20, 2013

(30) Foreign Application Priority Data

Jun. 24, 2010 (DE) .......................... 10 2010 024 903

(51) Int. Cl.
*F16F 1/38* (2006.01)
*F16F 15/08* (2006.01)

(52) U.S. Cl.
CPC ............... *F16F 15/08* (2013.01); *F16F 1/38* (2013.01); *F16F 1/3849* (2013.01); *F16F 1/3863* (2013.01); *Y10T 29/49611* (2015.01)

(58) Field of Classification Search
CPC ........ F16F 15/08; F16F 1/3849; F16F 1/3863; F16F 1/3856; F16F 1/38; Y10T 29/49611

USPC ............... 248/634, 638; 267/140.13, 140.12
See application file for complete search history.

(56) References Cited

U.S. PATENT DOCUMENTS

| 2004/0021259 | A1* | 2/2004 | Visage et al. | 267/140.13 |
| 2006/0091281 | A1* | 5/2006 | Miyahara et al. | 248/636 |
| 2007/0178258 | A1* | 8/2007 | Petit et al. | 428/34.1 |
| 2011/0255818 | A1* | 10/2011 | Vissers et al. | 384/537 |
| 2012/0267186 | A1* | 10/2012 | Hermann et al. | 180/382 |

FOREIGN PATENT DOCUMENTS

| DE | 42 34 116 A1 | 4/1993 |
| DE | 102 49 387 B3 | 2/2004 |
| DE | 10 2005 033 509 A1 | 1/2007 |

(Continued)

OTHER PUBLICATIONS

European Patent Office, PCT International Search Report and Written Opinion, International Application No. PCT/EP2011/003072 dated Sep. 23, 2011.

*Primary Examiner* — Nkeisha Smith
(74) *Attorney, Agent, or Firm* — Dennis J. Williamson; Moore & Van Allen PLLC

(57) ABSTRACT

A device for the elastic mounting of an engine, in particular an engine transmission unit, on a motor vehicle body, comprising a rigid support with a supporting section and a mounting section, to which the engine can be fastened, a rigid flange ring which can be fastened to the motor vehicle body and surrounds the full circumference of the supporting section, and a spring body which is elastically supported on the supporting section of the support and on an inner side of the flange ring.

15 Claims, 2 Drawing Sheets

(56) References Cited

FOREIGN PATENT DOCUMENTS

Figure 1:
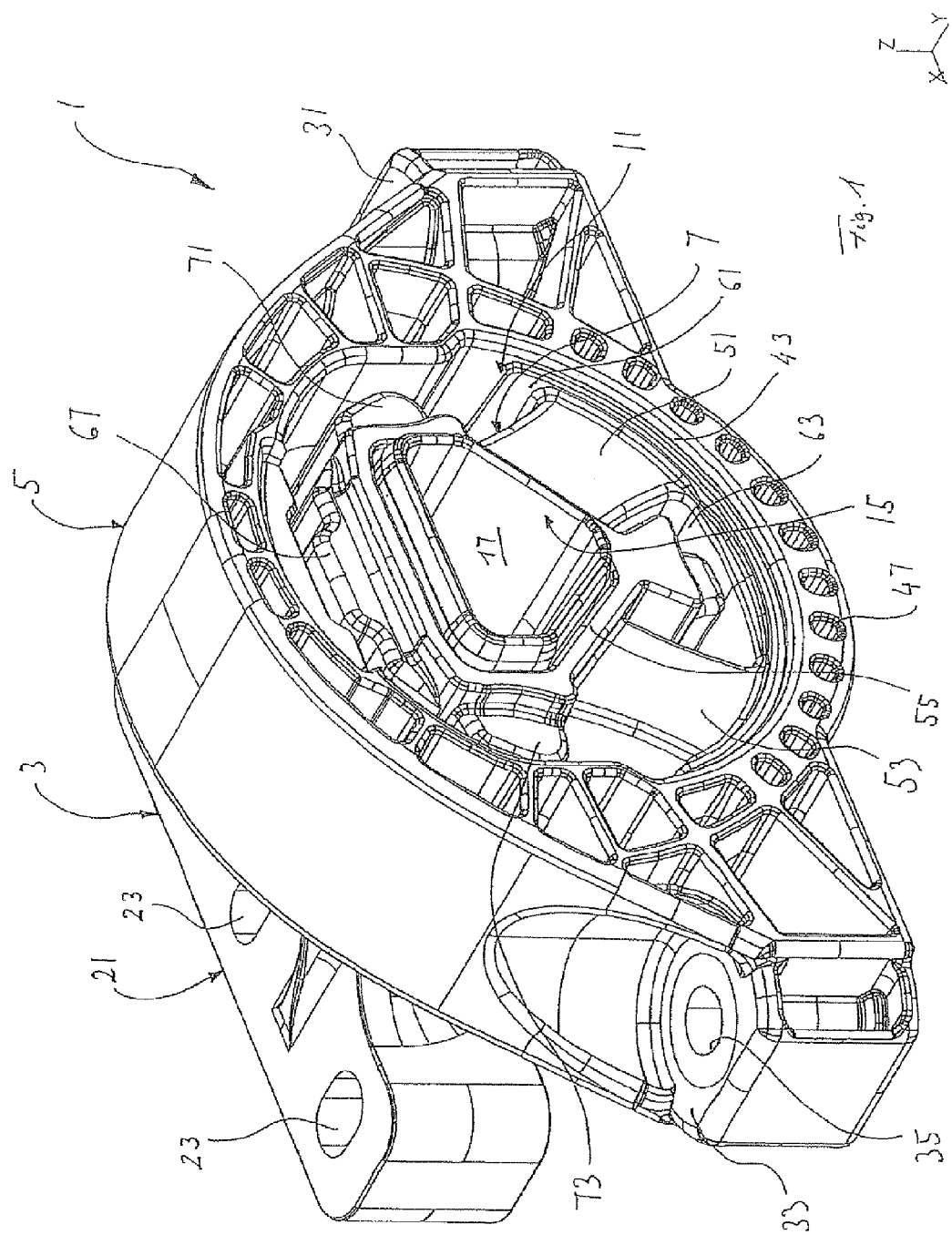

| | | |
|---|---|---|
| DE | 603 05 223 T2 | 3/2007 |
| DE | 20 2008 00 685 | 4/2008 |
| DE | 10 2007 006 709 A1 | 8/2008 |
| DE | 10 2008 038 519 A1 | 2/2010 |
| EP | 1 586 789 A1 | 10/2005 |
| FR | 2 832 477 A1 | 11/2001 |
| JP | 2002147530 A | 5/2002 |
| WO | WO 2009090071 A2 * | 7/2009 |

* cited by examiner

DEVICE FOR ELASTICALLY MOUNTING AN ENGINE AND METHOD FOR PRODUCING SAID MOUNTING

This application is filed under the provisions of 35 U.S.C. §371 and claims the benefit of International Patent Application No. PCT/EP2011/003072, filed on Jun. 21, 2011, entitled "Device for Elastically Mounting an Engine and Method for Producing Said Mounting", which claims the benefit of priority of German Application No. 10 2010 024 903.3, filed on Jun. 24, 2010, the contents of both of which are hereby incorporated by reference herein in their entirety.

The invention relates to an apparatus for elastically mounting an engine, in particular an engine-gear unit, at a motor vehicle body, as well as a method for manufacturing such an engine mount.

In order to provide a durable mounting for an engine, very high static engine weight loads as well as dynamic oscillating loads resulting from high-frequency engine service vibrations as well as from low-frequency driving loads are to be considered upon design of the engine mount.

A known elastic mount as it is for example described in DE 20 2008 000 685 has a rigid support member to which the engine of the motor vehicle is to be attached, and a flange separate from the support member to be rigidly attached to the vehicle body. The flange, made of metal, is formed in the shape of a bridge that only partially encircles the support member in transverse direction. The bridge or bow shaped flange extends in a longitudinal direction that corresponds to the driving direction of the vehicle when assembling the engine mount. The support member has on the one hand a mounting section that is in particular freely accessible from above, at which the motor vehicle engine is to be placed and fixated, and on the other hand a support section that is surrounded by the bridge shaped flange and at which the support member is supported via an elastomeric body arranged therebetween.

It is an object of the invention to overcome the disadvantages of the prior art, in particular to further develop a generic apparatus such that a low priced and simple manufacturing method can be employed for at least the same, preferably an increased strength of the engine mount.

This object is achieved by the features of claim 1.

Accordingly, an apparatus for elastically mounting an engine, in particular an engine-gear unit, to a motor vehicle body is provided. The elastic mount has a rigid support member with a support section and a mounting section at which the engine can be attached. Furthermore, the apparatus according to the invention has a flange ring attachable to the motor vehicle body that completely surrounds the support section. A spring body is elastically supported at the support section of the support member as well as at an inner side of the flange in order to enable a spring-type dampening movement between the support member and the flange ring.

It became apparent that by the formation of a fully surrounding flange ring, in particular made of one piece, the clear height and thus the material required for the realisation of the flange ring can be significantly reduced compared to the known bridge concept. Thus, cost reductions can be achieved as soon as high unit numbers for the engine mounts are required. Especially owing to the low clear height the free space becoming available according to the invention can be used for other components within the very limited space of the engine compartment.

In a further development of the invention the flange ring forms a completely closed ring structure that is in particular formed circularly or cylindrically at the inner wall.

In a preferred embodiment the flange ring is manufactured from an in particular fibre-reinforced plastic piece, in particular injection moulded. Notably, with this measure not only the clear height can be further reduced but also the weight as well as the mass of the flange ring can be additionally reduced without impairment of the strength of the flange ring. In contrast, it became apparent, that owing to the combination of a ring structure and manufacturing from plastic a high strength flange ring could be realised. Preferably a plastic with an increased portion of fibres, in particular a glass fibre portion of in particular more than 35 percent and a maximum of 60 percent, in particular 45 percent to 55 percent shall be used for the fibre-reinforced plastic, as it is distributed for example under the trade mark Ultramid® of BASF.

In a preferred embodiment of the invention a frictional fixation of the spring body at the flange ring and/or the support member is realised without a metal insert, that is to say without using a metal material. In this way not only the weight of the of the engine mount is significantly reduced but also the manufacturing costs, because metal components in combination with elastomeric springs always necessitate cost intensive manufacturing measures. For example, a vulcanising step using an adhesive can be dispensed with.

In a preferred embodiment of the invention also the support member is made from a plastic material. Suitable plastics are for example the polyphenyl ether distributed by Degussa under the trade mark Vestoran® or polyamides 6 or 6.6 as they are distributed as Technyl® by Rhodia, as Radilon® by Radici, as Durethan® by Lanxess and as Latamid® by Lati.

In order to obtain a frictional fixation of the spring body at the flange ring and/or the support section of the support member, the spring body can be moulded to or overmoulded at the inside of the flange ring and/or at the outside of the support section, wherein a vulcanisation step may well be employed to this effect, wherein preferably an elastomer/plastic material combination is employed in which effects of adhesion may occur at the boundary surfaces without usage of additional adhesion systems.

Preferably a coherent intermediate assembly unit is formed in a first manufacturing step consisting of the support member and the spring body, wherein this intermediate assembly unit is firmly coupled with the flange ring in a second manufacturing step.

In order to realise the second manufacturing step, no adhesive and/or vulcanisation should be used but a metal-free insert, in particular made of plastic.

In a preferred embodiment of the invention a rigid insert is attached to the spring body at the side facing the flange and/or at the side facing the support member for a frictional fixation of the spring body at the support member and/or the flange in order to avoid a vulcanisation in this area, at least concerning the flange ring or the support member.

The rigid insert is preferably formed of plastic. In order to attach the insert at the spring body and thereby create an intermediate assembly unit consisting of the support member, the elastomeric body and the insert, the spring body may be moulded to the rigid insert at the side of the flange ring or at the side of the support member, in particular using vulcanisation.

In a further development of the invention the insert is attached to the flange ring and/or the support member at its side facing the flange ring and/or at its side facing the support member without any chemical adhesive or vulcanisation step, in particular by means of a mechanical retaining lug structure.

Preferably the retaining lug structure is realised by at least one protrusion with an undercut, in particular at the side of the insert facing the flange ring and/or facing the support member as well as by a tapered depression in the flange ring and/or in the support member, essentially complementary in shape to the respective at least one protrusion, wherein preferably the depression is formed at the side of the flange ring and/or of the support member that faces the insert.

The mechanical retaining lug structure realises an immovable, frictional coupling between the insert and the flange ring and/or the support member so that no coupling by adhesive/vulcanisation is needed.

In a further development of the invention the at least one protrusion is a web made of one piece with the insert, the web extending preferably axially with respect to the ring axis of the flange ring and essentially rectilinear. Furthermore, the web may present an undercut in its cross section, owing to which a retaining lug function is achieved with the depression in the support member and/or the flange ring. The web may extend essentially across the entire axial width of the insert.

In a preferred embodiment of the invention the mechanical retaining lug structure additionally has an annular protrusion that extends in circumferential direction of the flange ring and may also be formed as one piece with the insert. The annular protrusion structurally connects the webs with each other so that a coherent structure is formed by web and annular protrusion. Furthermore the annular protrusion may be disposed essentially in an axial centre of the flange ring, in particular perpendicularly to the webs. The annular protrusion may be formed without an undercut.

In a further development of the invention an in particular channel-shaped recess, preferably extending essentially in parallel with the axial direction, is formed respectively between the depressions extending essentially in axial direction, which may be formed in the flange ring as well as in the support member to form the retaining lug structure.

In a preferred embodiment of the invention recesses are arranged at the circumference of the ring flange in order to further reduce the weight of the engine mount. The recesses at the circumference of the ring flange are separated from each other essentially by thin wall-like webs. The wall-like webs as well as the recesses extend in axial direction. Therein the wall thickness of the wall-like web remains constant across the inner width of the recess. The wall thickness of a wall-like web may preferably be smaller than an inner width of the recess adjacent thereto.

In a further development of the invention the insert, which is preferably formed out of plastic, is a curved plate in particular shaped as a circular section and as a section of a ring-shape. The ring section shape has a circumferential extension of less than 180°, preferably more than 90°.

Since the insert may be formed out of plastic, the insert may be overmoulded by the flange ring out of plastic and/or the support member out of plastic. Preferably the insert as well as the flange ring and/or the support member are manufactured by means of a two component injection moulding method.

In a preferred embodiment of the invention the spring body is formed by an arrangement of at least two spring arms that, in particular in the mounted state of the apparatus, extend in a V-arrangement from the support member to the inside of the flange ring essentially symmetrically to a vertical axis. The vertical axis may preferably pass through a centre of a circle defined by the essentially circular inside of the flange ring.

In a preferred embodiment of the invention the arrangement of the spring body has additionally at least one spring abutment. At least one spring abutment may be provided between the two spring arms in the acute angle space and/or in the reflex angle space of the V-arrangement.

In a preferred embodiment of the invention the arrangement of the spring body is made of one piece of elastomer, in particular injection moulded.

In a further development of the invention the at least two spring arms respectively extend essentially perpendicularly away from an essentially flat support surface of the support section of the support member. The two support surfaces may be respectively disposed in an equal angle of inclination with respect to the vertical axis. Preferably the at least two spring arms form a main radial extension direction the in particular imaginary intersection of which is disposed in the area of a centre of a circle, in particular coincides with the latter, which may be defined by the essentially circular inside of the flange ring.

Furthermore, the invention relates to a method for manufacturing an apparatus, in particular according to the invention, for elastically mounting an engine, in particular an engine-gear unit, to a motor vehicle body. According to the invention the support member and the flange ring are made of a plastic material without placing an intermediate metal layer between the support member and/or the flange ring as well as the spring body.

Figure 2:
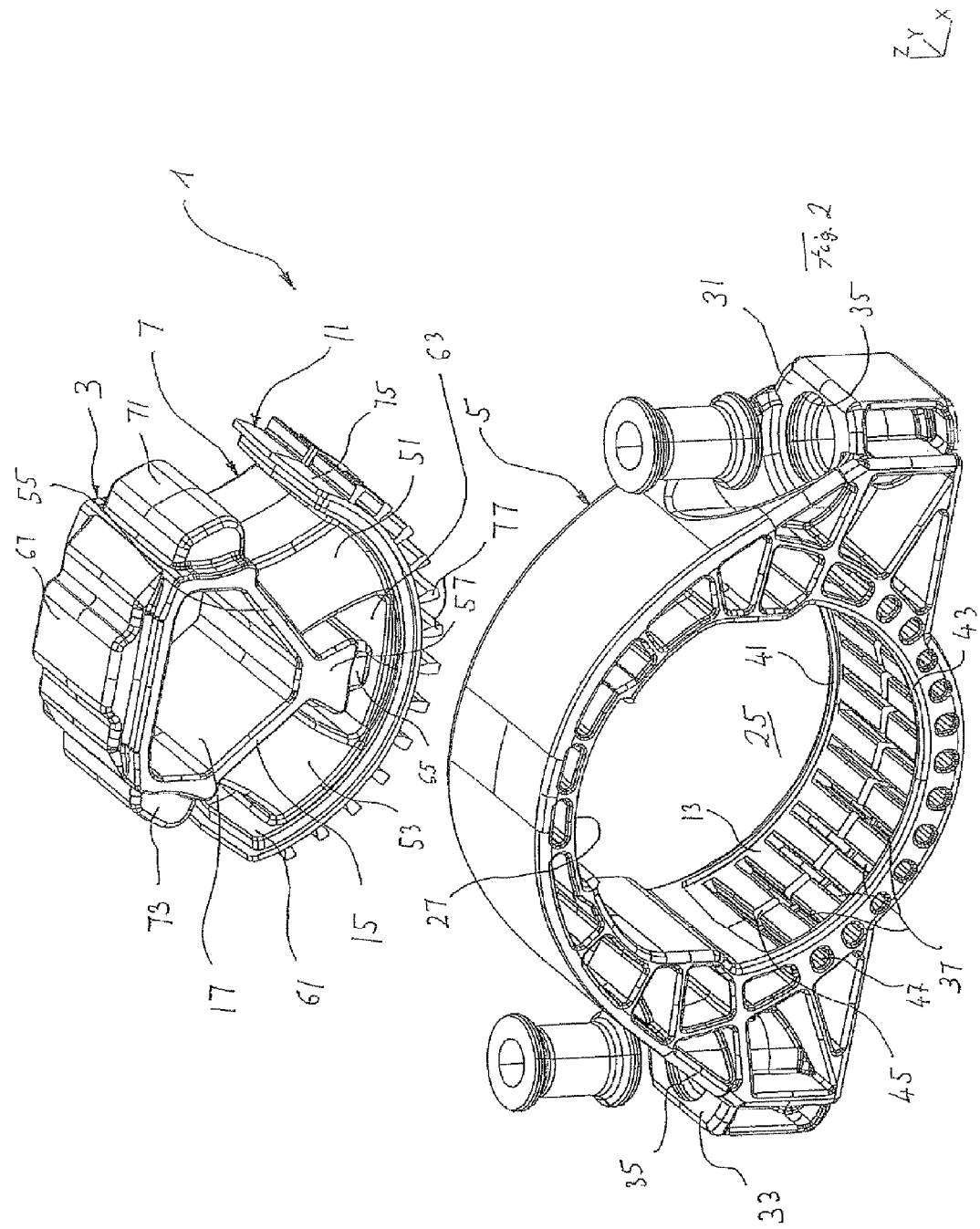

Further advantages, qualities and features of the invention will become clear from the following description of a preferred embodiment of the invention in conjunction with the accompanying drawings showing in FIG. 1 a perspective view of an apparatus according to the invention; and FIG. 2 a perspective partial exploded view of the apparatus according to the invention according to FIG. 1;

In the FIGS. 1 and 2 an engine mount according to the invention is generally given the reference numeral 1. The engine mount 1 has essentially four main components, that is a support member 3, that is only partially represented, a flange ring 5 at least partially surrounding the support member completely, a spring body arrangement 7 comprising at least two spring arms in a V-arrangement, and an insert 11 shaped as a ring section that is to be fitted between an inside 13 of the flange ring 5 and a coupling side of the elastomer body arrangement 7 facing the flange ring, which is visible in FIG. 1.

The support member 3 comprises a support section 15 that has an essentially triangular cross section and forms a receiving space 17 by means of a hollow profile. The inner width of the receiving space 17 is essentially constant in an axial direction Y so that the receiving space 17 can receive a mounting section 21 of the support member 3 that is T-shaped when seen from above (in Z-direction). A longitudinal leg (not shown in detail) of the mounting section 21 of the support member 3 is pressed into the receiving space 17 complementary in shape in order to form a rigid structure for the support member 3. It is to be noted that the mounting section and the support section may also be made of one piece.

As visible in FIG. 1, in the area of the short leg of the T-shaped mounting section several through holes 23 are provided for fixation of the engine unit of the motor vehicle, not represented. Commonly the engine mount 1 is arranged and fixed in a vehicle such that the axis Z forming a centre axis for the flange ring 5 and/or forming a longitudinal axis for the support member 3 is disposed vertically to the driving direction. Depending on the torque output direction of the engine, also other mounting positions may be provided.

The support member 3 is dimensioned such that the support section 15 is completely surrounded by the flange ring 5, wherein the mounting section extends out of the flange ring in Y-direction so that the area necessary for mounting the engine is located completely outside the flange ring 5.

The support member 3 may be made of plastic, in particular injection moulded.

The flange 5 defines a ring space 25 delimited in circumferential direction and delimited in X and Z direction by an essentially circular inner wall 27.

The flange ring 5 has assembly reinforcements 31, 33 having a mounting hole 35 and protruding laterally in X-direction, via which the flange ring 5 and thus the engine mount 1 can be attached to a body part of the vehicle not represented.

As visible in FIGS. 1 and 2, the structure of the flange ring 5 is implemented as a carcass structure with a large number of recesses all of which extend in axial direction Y. The recesses are separated form each other by thin-walled webs, wherein the thickness of the webs is significantly smaller than the inner width of the recess.

As visible in FIG. 2, a large number of rectilinear depressions 37 are provided at the essentially circular inner wall 27 of the flange ring 5, the depressions extending essentially across the entire, essentially constant width (in Y-direction) of the flange ring. All the depressions 37 are delimited and closed at the axial border area 41, 43 of the inner wall 27. Towards the space 25 the depressions are open.

Each of the depressions 37 is implemented with a taper not represented in detail, i.e. the inner width of the depression 37 increases from the side of the inner wall 27 radially towards outside.

Essentially in the middle of the axial width (in Y-direction) of the inner wall in the area of the arrangement of the depressions 37 a connecting channel 45, extending partially circumferentially, is provided connecting the depressions with each other. The connecting channel is implemented with a constant width, i.e. without taper.

When looking at the engine mount 1, in particular at the flange ring 5, in Y-direction it can be noted that the arrangement of the depressions 37 extends from about a 4 o'clock position towards a 8 o'clock position. The depressions 37 are arranged at equal distances to each other. The dimensioning of the depressions 37 is the same for each depression.

As visible from FIG. 2, a recess 47 extending in axial direction (Y-direction) and being essentially of equal size between two depressions, is disposed in the intermediate wall area of two adjacent depressions.

In a first procedural step the spring body arrangement 7 is attached to the support member 3, in particular to the support section 15, without using a vulcanisation method, in particular without mixed adhesives. The fixation of the spring body arrangement 7 at t the support member 3 can be realised by means of overmoulding. Therein the entire elastomer spring arrangement is manufactured in one piece.

The spring body arrangement 7 comprises two spring arms 51, 53, arranged at an angle to each other, as principal components that extend nearly vertically away from two support arms 55 of the support section 15. The support arms 55 are arranged to each other in a Y-shape, wherein a reinforced base 57 connects the support arms with each other. The angle formed between the support arms is larger than 90°.

The support arms 55 as well as the spring arms 51, 53 are axially symmetrical to an axis of symmetry or to a symmetry plane extending in Z-direction. The spring arms 51, 53 are in direct contact with the support section 15 of the support member 3 as well as in direct contact with an inside 61 of the inserts 11. The spring arms 51, 53 serve the purpose of elastically transmitting dynamic and static loads acting on the support member 3 to the flange ring and vice versa.

As visible in FIG. 2, the width and depth (in X-direction) of the spring arms 51, 53 is essentially constant. Only at the connection ends a slight reinforcement of the spring arms 51, 53 is provided for good load introduction.

Furthermore the spring body arrangement 7 comprises several abutments.

A first Z-abutment 65 delimiting an amplitude of movement downwards in Z-direction is disposed in the small space 63 delimited by the two spring arms 51, 53 and at the base leg of the Y-shape of the support arms 55. A further Z-abutment is provided at the opposite area of the support section 15 and given the reference numeral 67.

At the symmetric positions (symmetrical with respect to the Z-plane) two further lateral abutments 71, 73 are provided that define a limitation of an amplitude of movement in X-direction.

As already mentioned above, it is to be noted that all spring elements, such as the spring arms 51, 53 as well as the abutments 71, 73 are injection moulded in one manufacturing step out of one and the same material.

The insert 11 that, like the arrangement of the depressions 37, circularly extends from a 4 o'clock position to an 8 o'clock position has a curved plate structure with a constant width in Y-direction.

At a radial outside 75 of the insert 11 several protrusions 77 are provided extending rectilinearly in axial direction (Z-direction) and having a constant cross section along the Y-direction. The cross section of the protrusion 77 is defined by its cross sections at the two ends. The protrusion has a symmetrical structure. The number of protrusions 77 is adjusted to the number of depressions 37. The external dimensions of the protrusions 77 is complementary in shape to the inner dimension of the depressions 37 so that the engagement of the protrusions 77 in the depressions 37 entails a hook-type engagement of the insert 11 with the flange ring.

In order to realise this hook-type engagement mechanism, the flange ring may be moulded around a unit consisting of the support member 3, the elastomer spring arrangement 7 and the insert 11, the unit being placed in an injection mould after its manufacture. In this way the tapers at the depressions 37 as well as the undercuts at the protrusions 77 can be realised.

Through the overmoulding a clearance-free connection of the flange ring to the insert 11 is provided. Thereby unwanted sounds of the engine mount, as occurring in known mounts between mount portions fitted to each other due to manufacturing tolerances, can be avoided.

With the engine mount according to the invention it is possible to realise a mount with high loading capacity, wherein any kind of connection system, like vulcanisation and the use of adhesives, can be completely dispensed with. In so far no process-specific measures concerning such chemical bondings, like degrees of cleanness, time prescriptions and material combinations due to primers, need to be considered. Preferably a fibre-reinforced plastic is used for the flange ring, wherein a corresponding plastic is used for the insert 11. For the elastomer spring body natural rubber or other kinds of rubber may of course be employed.

Owing to the fact that the engine mount according to the invention is essentially free of metal components, much lighter types of mounts can be achieved. It is regarded as a particular advantage of the invention that it enables the use of the manufacturing method of two component injection moulding.

The features disclosed in the above description, the figures and the claims may be relevant for the realisation of the invention in its different embodiments individually as well as in any combination.

LIST OF REFERENCE NUMERALS 1 engine mount
3 support member
5 flange ring
7 spring body arrangement
11 insert
13 inside
15 support section
17 receiving space
21 mounting section
23 holes
25 ring space
27 circular inner wall
31, 33 assembly reinforcements
35 mounting hole
37 depressions
41, 43 axial border area
45 connecting channel
47 recess
51, 53 spring arms
55 support arms
57 base
61 inside
63 small space
65, 67 Z-abutment
71, 73 lateral abutments
75 radial outside
77 protrusions
Y axial direction
Z axis

What is claimed is:

1. An apparatus for elastically mounting an engine to a motor vehicle body, comprising:
a support member with a support section and a mounting section to which the engine can be attached, said support member being rigid;
a flange ring attachable to the motor vehicle body and completely surrounding the support section, said flange ring being rigid; and
a spring body elastically supported at the support section of the support member and at an inner side of the flange ring,
an insert attached to the spring body, the insert being rigid, wherein the insert is attached to the spring body at a side of the spring body facing the flange ring to fix the spring body to the flange ring, and
wherein the insert is attached to the flange ring at a side of the insert facing the flange ring by a retaining lug structure comprising: at least one protrusion with an undercut on at least one of the insert and the flange ring, and at least one tapered depression on at least one of the insert and the flange ring, the at least one tapered depression comprising a complementary shape to the at least one protrusion, wherein the at least one protrusion engages hook-like into the at least one depression, wherein the flange ring comprises plastic, and the flange ring is overmolded on the insert and the insert is molded to the spring body under vulcanization without an adhesive.

2. The apparatus according to claim 1, in which the flange ring forms a completely closed ring structure, and wherein the flange ring is manufactured from a fibre-reinforced plastic piece.

3. The apparatus according to claim 2, wherein the flange ring is injection molded.

4. The apparatus according to claim 1, in which the spring body is fixed to the flange ring without an intermediate metal insert.

5. The apparatus according to claim 1, wherein the insert is attached to the spring body at least at one of the side of the insert facing the spring body.

6. The apparatus according to claim 1, wherein the flange ring has a ring axis and the insert has an axial width and the at least one protrusion comprises at least one web made of one piece with the insert including at least one configuration of (a) extending axially and essentially rectilinearly with respect to the ring axis of the flange ring or (b) presenting an undercut in its cross section extending essentially across the axial width of the insert.

7. The apparatus according to claim 6, in which the retaining lug structure includes an annular protrusion including at least one configuration of (a) connecting a first web of the at least one web to a second web of the at least one web, (b) being disposed essentially in an axial center of the flange ring, perpendicular to the at least one web, or (c) being made of one piece with the insert.

8. The apparatus according to claim 1, including at least one configuration of (a) the at least one tapered depression comprises a plurality of tapered depressions and a recess extending essentially in an axial direction being formed respectively between at least two of the plurality of tapered depressions extending essentially in the axial direction or (b) recesses arranged on the flange ring and separated from each other by essentially thin-walled webs extending in an axial direction with uniform thickness, wherein the thickness of one web of the thin-walled webs is smaller than an inner width of a recess adjacent to the one web.

9. The apparatus according to claim 1, including at least one configuration of (a) the insert forming a circular ring section having a circumferential extension of less than 180°, (b) the insert being formed out of plastic, (c) the insert being overmolded by the support member, (d) or the insert and the flange ring being manufactured by a two-component injection moulding method.

10. The apparatus according to claim 1, in which the spring body is formed by an arrangement of at least two spring arms that extend in a V-arrangement from the support member to an essentially circular inside of the flange ring essentially axially symmetrically to a vertical axis that preferably passes through a center of a circle defined by the essentially circular inside of the flange ring, wherein the arrangement of the at least two spring arms of the spring body additionally presents at least one spring abutment, wherein the arrangement of the at least two spring arms of the spring body includes at least one of (a) at least one spring abutment being provided between the at least two spring arms in an acute angle space, in a reflex angle space, or (b) the spring body being made of one piece of elastomer.

11. The apparatus according to claim 10, in which the at least two spring arms respectively extend essentially perpendicularly away from an essentially flat support surface of the support section, wherein in particular the two spring arms are respectively disposed in an equal angle of inclination with respect to a vertical axis of the support member, the at least two spring arms form a main radial extension direction, an imaginary intersection of which is disposed in substantially the center of the circle.

12. A method for manufacturing an apparatus for elastically mounting an engine to a motor vehicle body, the method comprising:
   providing a support member with a support section and a mounting section to which the engine can be attached wherein the support member is formed as a rigid member;
   providing a flange ring attachable to the motor vehicle body and completely surrounding the support section wherein the flange ring is formed as a rigid member;
   attaching a rigid insert to a spring body at a side of the spring body facing the flange ring to fix the spring body to the flange ring; and
   elastically supporting the spring body at the support section of the support member and at an inner side of the flange ring;
   attaching the insert to the flange ring at a side of the insert facing the flange ring by a retaining lug structure comprising: at least one protrusion with an undercut on at least one of the insert and the flange ring, and at least one tapered depression on at least one of the insert and the flange ring, the at least one tapered depression comprising a complementary shape to the at least one protrusion, wherein the at least one protrusion comprises a hook-type engagement into the at least one depression,
   wherein the flange ring comprises plastic, and overmolding the flange ring on the insert and attaching the spring body to the insert without adhesive.

13. The method according to claim 12, further comprising forming the support member and the flange ring from plastic material without disposing a metal intermediate layer between any of the support member, the flange ring, or the spring body.

14. An apparatus for elastically mounting an engine to a motor vehicle body, comprising:
   a rigid support member with a support section and a mounting section to which the engine can be attached;
   a rigid flange ring having a flange ring axis, the flange ring attachable to the motor vehicle body and completely surrounding the support section; and
   a spring body elastically supported at the support section of the support member and at an inner side of the flange ring,
   wherein a rigid insert is attached to the spring body facing the flange ring to fix the spring body to the flange ring, and
   wherein when the insert is attached to the flange ring at a side of the insert facing the flange ring by a retaining lug structure comprising: at least one protrusion with an undercut on at least one of the insert and the flange ring and by at least one tapered depression on at least one of the insert and the flange ring, the at least one tapered depression comprising a complementary shape to the at least one protrusion, wherein the at least one protrusion comprises a hook-type engagement into the at least one tapered depression,
   including at least one configuration of (a) the insert forming a circular ring section having a circumferential extension of more than 90° and less than 180° about the flange ring axis, and (b) the flange ring being overmolded on the insert.

15. An apparatus for elastically mounting an engine to a motor vehicle body, comprising:
   a support member with a support section and a mounting section to which the engine can be attached, said support member being rigid;
   a flange ring attachable to the motor vehicle body and completely surrounding the support section, said flange ring being rigid; and
   a spring body elastically supported at the support section of the support member and at an inner side of the flange ring,
   an insert attached to the spring body, the insert being rigid, wherein the insert is attached to the spring body at a side of the spring body facing the flange ring to fix the spring body to the flange ring, and
   wherein the insert is attached to the flange ring at a side of the insert facing the flange ring by a retaining lug structure comprising: at least one protrusion with an undercut on at least one of the insert and the flange ring, and at least one tapered depression on at least one of the insert and the flange ring, the at least one tapered depression comprising a complementary shape to the at least one protrusion, wherein the at least one protrusion comprises a hook-type engagement into the at least one depression,
   wherein the flange ring comprises plastic, and the flange ring is overmolded on the insert and the insert is molded to the spring body under vulcanization without an adhesive;
   including at least one configuration of (a) the insert forming a circular ring section having a circumferential extension of less than 180°, (b) the insert being formed out of plastic, (c) the insert being overmolded on the support member, (d) or the insert and the flange ring being manufactured by a two-component injection moulding method; in which the insert forms a circular ring section having a circumferential extension of more than 90°.

* * * * *